United States Patent
Surtani et al.

(10) Patent No.: US 8,762,664 B2
(45) Date of Patent: Jun. 24, 2014

(54) REPLICATING CACHE NODES IN A CLUSTER

(75) Inventors: Manik Ram Surtani, London (GB); Brian Edward Stansberry, Manchester, MO (US)

(73) Assignee: Red Hat, Inc., Raleigh, NC (US)

( * ) Notice: Subject to any disclaimer, the term of this patent is extended or adjusted under 35 U.S.C. 154(b) by 799 days.

(21) Appl. No.: 11/897,711

(22) Filed: Aug. 30, 2007

(65) Prior Publication Data

US 2009/0063796 A1 Mar. 5, 2009

(51) Int. Cl.
*G06F 12/00* (2006.01)
(52) U.S. Cl.
USPC ............ 711/162; 711/119; 711/161; 711/165
(58) Field of Classification Search
USPC .................................. 711/119, 161–162, 165
See application file for complete search history.

(56) References Cited

U.S. PATENT DOCUMENTS

| | | | |
|---|---|---|---|
| 6,633,891 B1* | 10/2003 | Bamford et al. | 1/1 |
| 6,996,674 B2* | 2/2006 | Chiu et al. | 711/118 |
| 2007/0180314 A1* | 8/2007 | Kawashima et al. | 714/15 |
| 2007/0198573 A1* | 8/2007 | Samson et al. | 707/102 |
| 2008/0288630 A1* | 11/2008 | Merat et al. | 709/224 |
| 2009/0006593 A1* | 1/2009 | Cortes | 709/223 |

OTHER PUBLICATIONS

Ben Wang, JBoss Cache as a POJO Cache, Nov. 9, 2005, pp. 1-13, Published on ONJava.com.

* cited by examiner

*Primary Examiner* — Jasmine Song
(74) *Attorney, Agent, or Firm* — Lowenstein Sandler LLP

(57) ABSTRACT

A method and apparatus for replicating instances of cache nodes in a cluster is described. In one embodiment, the number of available cache nodes in the cluster is determined. Available cache nodes from the cluster are selected based on a parameter. An instance of a cache node is replicated to only one of the selected cache nodes in the cluster.

20 Claims, 6 Drawing Sheets

REPLICATING CACHE NODES IN A CLUSTER

TECHNICAL FIELD

Embodiments of the present invention relate to cache, and more specifically to a tree-structured, clustered, transactional cache.

BACKGROUND

Caches are commonly used in computer system. A cache is a collection of data duplicating original values stored elsewhere or computed earlier, where the original data is expensive to fetch (due to slow access time) or to compute, relative to the cost of reading the cache. In other words, a cache is a temporary storage area where frequently accessed data can be stored for rapid access. Once the data is stored in the cache, future use can be made by accessing the cached copy rather than re-fetching or recomputing the original data, so that the average access time is lower.

Caches have proven to be extremely effective in many areas of computing because access patterns in typical computer applications have locality of reference (temporal and spatial locality). Temporal locality refers to data that are accessed close together in time. Spatial locality refers to data that might or might not be located physically close to each other.

In a clustered tree-structured cache, the cluster may also provide redundant storage for security and backup purposes by replicating data to all instances in the cache cluster. However, replicating to all instances may prove to impact memory and network traffic every time another instance is added to a cluster.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for replicating cache nodes in a tree-based cache cluster. Available cache nodes in the cluster are detected. A cache node is selected from the cluster based on a parameter. An instance of a cache node is replicated to only one of the selected cache nodes in the cluster based on the parameter.

The cache as presently described can be configured to be either local (standalone) or clustered. If in a cluster, the cache can be configured to replicate changes, or to invalidate changes. In a local mode, local caches do not join a cluster and do not communicate with other caches in a cluster.

Replicated caches replicate all changes to some or all of the other cache instances in the cluster. Replication can either happen after each modification (no transactions), or at the end of a transaction (commit time).

Replication can be synchronous or asynchronous. Use of either one of the options is application dependent. Synchronous replication blocks the caller (e.g. on a put( )) until the modifications have been replicated successfully to all nodes in a cluster. Asynchronous replication performs replication in the background (the put( ) returns immediately). One embodiment of a tree-structure cache may be for example, JBoss® Cache which offers a replication queue, where modifications are replicated periodically (i.e. interval-based), or when the queue size exceeds a number of elements, or a combination thereof.

Asynchronous replication is faster (no caller blocking), because synchronous replication requires acknowledgments from all nodes in a cluster that they received and applied the modification successfully (round-trip time). However, when a synchronous replication returns successfully, the caller knows for sure that all modifications have been applied to all cache instances, whereas this is not be the case with asynchronous replication. With asynchronous replication, errors are simply written to a log. Even when using transactions, a transaction may succeed but replication may not succeed on all cache instances.

When using transactions, replication only occurs at the transaction boundary—i.e., when a transaction commits. This results in minimizing replication traffic since a single modification is broadcast rather than a series of individual modifications, and can be a lot more efficient than not using transactions. Another effect of this is that if a transaction were to roll back, nothing is broadcast across a cluster.

Depending on whether the cluster is in asynchronous or synchronous mode, JBoss® Cache will use either a single phase or two phase commit protocol, respectively.

Figure 1:
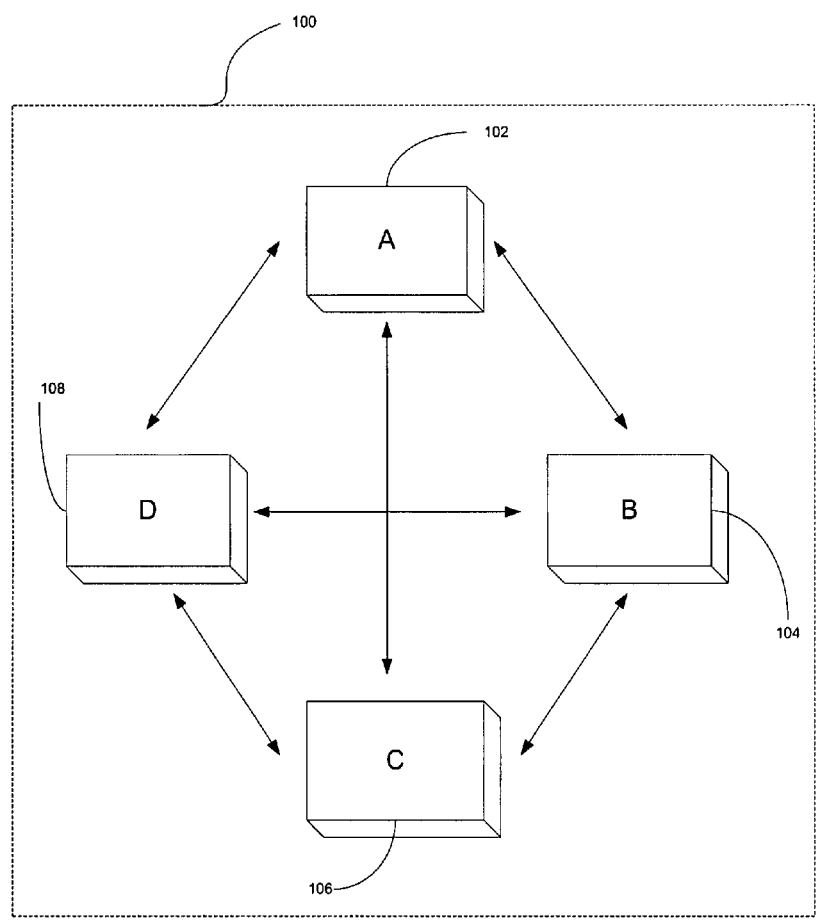
FIG. 1 illustrates a block diagram of replicated node caches in a cluster.

FIG. 1 illustrates a block diagram of replicated node caches in a cluster 100. An instance of a cache node is replicated to all cache nodes in the cluster. As such, data from cache node 102 is replicated to cache nodes 104, 106, and 108. Data from cache node 104 is replicated to cache nodes 102, 106, and 108. Data from cache node 106 is replicated to cache nodes 102, 104, and 108. Data from cache node 108 is replicated to cache nodes 102, 104, and 106.

Figure 2:
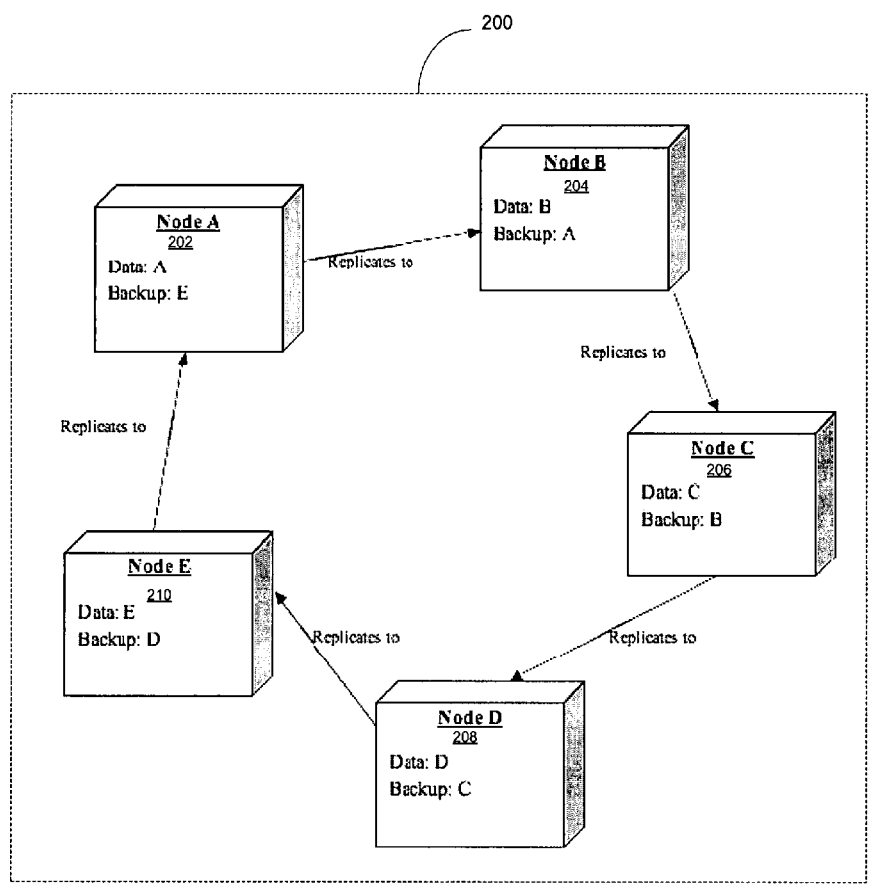
FIG. 2 illustrates a block diagram of a cluster with buddy replication of node caches in accordance with one embodiment.

FIG. 2 illustrates a block diagram of a cluster with buddy replication of node caches in accordance with one embodiment. Buddy replication is based on a concept where data is replicated to a finite number of nodes in a cluster rather than the entire cluster. This helps a cluster scale by not impacting network replication traffic, nor node memory usage as more nodes are added.

Network traffic is also restricted to the number of buddy nodes configured. This may not be that great a saving as IP multicast may be used to broadcast changes, but replies (if synchronous replication is used) and subsequent wait time may increase in a linear fashion with every node added to a cluster. When the number of buddies is finite and fixed, nodes can be added to a cluster without any such impact as this replication cost is always static.

With buddy replication, memory usage for each node will be approximately (b+1) X where X is the average data size of each node and b is the number of buddies per node. This scales a lot better than total replication where each node would hold nX where n is the number of nodes in the cluster. Being a function of n, you can see that with total replication, memory usage per node increases with the number of nodes while with buddy replication, this does not happen.

It is assumed that a decent load balancer will be in use so requests are evenly spread across a cluster and sticky sessions (or equivalent for use cases other than HTTP session replication) are used so that recurring data accesses happen on fixed nodes. For illustration purposes, the number of buddies is set to one. FIG. 2 illustrates five nodes in a cluster: nodes A, B, C, D and E. Each node has its own data, and the backup data of one other node. For example, node A 202 stores its own data from node A 202 and data from node E 210. Node B 204 stores its own data from node B 204 and data from node A 202. Node C 206 stores its own data from node C 206 and data from node B 204. Node D 208 stores its own data from node D 208 and data from node C 206. Node E 210 stores its own data from node E 210 and data from node D 208. As such, data is only replicated to the buddy node, not to the entire cluster (synchronous or asynchronous replication may be used).

One of the most common use cases of Buddy Replication is when a replicated cache is used by a servlet container to store HTTP session data. One of the pre-requisites to buddy replication working well and being a real benefit is the use of session affinity, more casually known as sticky sessions in HTTP session replication speak. What this means is that if certain data is frequently accessed, it is desirable that this is always accessed on one instance rather than in a round-robin fashion as this helps the cache cluster optimize how it chooses buddies, where it stores data, and minimizes replication traffic.

Figure 3:
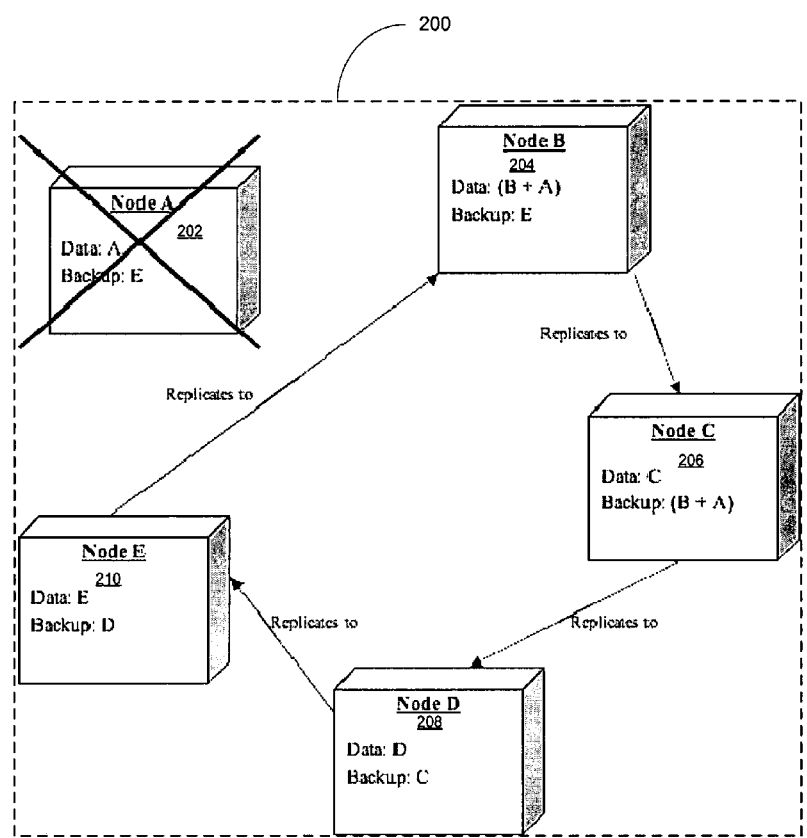
FIG. 3 illustrates a block diagram of a node failure in a cluster with buddy replication enabled.

FIG. 3 illustrates a block diagram of a node failure in a cluster with buddy replication enabled. If a node fails (e.g., Node A 202 is removed from the cluster) its data is still backed up on to node B 204. As nodes start looking for this data, it gravitates from node B 204 to the requesting node, which may take ownership of this data and treat it as its own. Node B 204 may also start acting as backup node for node E 210.

As requests come in to cache instances which do not have the requested data locally, nodes then ask the cluster for the data and move that data to their local state. Taking ownership of this data allows for the data most used by specific cache instances to be located closest to such cache instances. When a cache instance takes ownership of data, it forces the original owner (and any buddies) to remove this data from their in-memory state. In the above scenario of FIG. 3, this allows for the original state of A—backed up on B—to spread out evenly across the cluster as the load balancer directs requests meant for A across the cluster.

In accordance with an alternative embodiment, another implementation would include data slicing. The alternative to such a scenario where a node inherits all the backup data of a dead node is for the backup node to slice the data evenly and distribute it across the remaining cluster nodes rather than taking ownership of the data.

Behavior is precisely the same as when dealing with just one buddy. The first instance to provide a valid response to a data gravitation request is the one that is used as the source of data. When a buddy node dies, the Data Owner detects this, and nominates more buddies to meet its configured requirement. State transfers may be initiated to these buddies so backups are preserved.

Configuring Buddy Replication

A new configuration element—BuddyReplicationConfig—may be used. The element will take an XML config element, to maintain consistency with the way eviction policies and cache loaders are configured.

```
<attribute name="BuddyReplicationConfig">
    <config>
        <buddyReplicationEnabled>true</buddyReplicationEnabled>
<buddyLocatorClass>org.JBoss.cache.cluster.NextMemberBuddyLocator</buddyLocatorClass>
<buddyCommunicationTimeout>15000</buddyCommunicationTimeout>
        <buddyLocatorProperties>numBuddies =
3</buddyLocatorProperties>
<dataGravitationRemoveOnFind>true</dataGravitationRemoveOnFind>
<dataGravitationSearchBackupTrees>true</dataGravitationSearchBackupTrees>
            <autoDataGravitation>false</autoDataGravitation>
            <buddyPoolName>groupOne</buddyPoolName>
    </config>
</attribute>
```

If this configuration element is left empty or is ignored altogether, the BaseRPCInterceptor will revert to replicating to the entire cluster. The buddyLocatorClass element is optional, and defaults to NextMemberBuddyLocator. The configuration element is provided for future expandability/customization.

The buddyPoolName element is optional, and if specified, creates a logical subgroup and only picks buddies who share the same buddy pool name. This helps you (the sys admin) assert some control over how buddy selection takes place. For example, you may have 3 power sources in your HA cluster and you may want to ensure that buddies picked are never on the same power source. If not specified, this defaults to an internal constant name which then treats the entire cluster as a single buddy pool. The buddyCommunicationTimeout property is optional and defaults to 10000. This is the timeout used for RPC calls to remote caches when setting up buddy groups. The only mandatory property here is buddyReplicationEnabled, which is used to enable/disable buddy replication.

In its simplest form, Buddy Replication could be enabled with:

```
<attribute name="BuddyReplicationConfig">
    <config>
        <buddyReplicationEnabled>true</buddyReplicationEnabled>
    </config>
</attribute>
```

Gravitation of Data

Data gravitation is implemented as an Interceptor, that sits after the CacheLoaderInterceptor. If data gravitation is enabled for the invocation (more on this in a bit) the interceptor tests if the node exists in the cache (after potentially loading/activating it). If not, it will broadcast a data gravitation call for this node and all subnodes, and proceed to take ownership of it. Enabling data gravitation for a particular invocation can be done in two ways. Enabling autoData-Gravitation (false by default) or by setting an Option (see the Options API).

Upon startup, the BuddyManager will use the configured BuddyLocator implementation to help it locate and select its buddy or buddies. Note that the BuddyLocator is only invoked when a change in cluster membership is detected.

To ensure that backup data is maintained separate from primary data on each node, each node will use an internal subtree for each buddy group it participates in, and will contain the name of the Buddy Group it is backing up for. This Buddy Group name is simply a String representation of JGroups Address of the Data Owner of that Buddy Group.

```
/_buddy_backup_/server01:7890/
/_buddy_backup_/server02:7890/
```

Also, users would have to ensure that any eviction policies set up are not applied to the /_buddy_backup_subtree.

Figure 4:
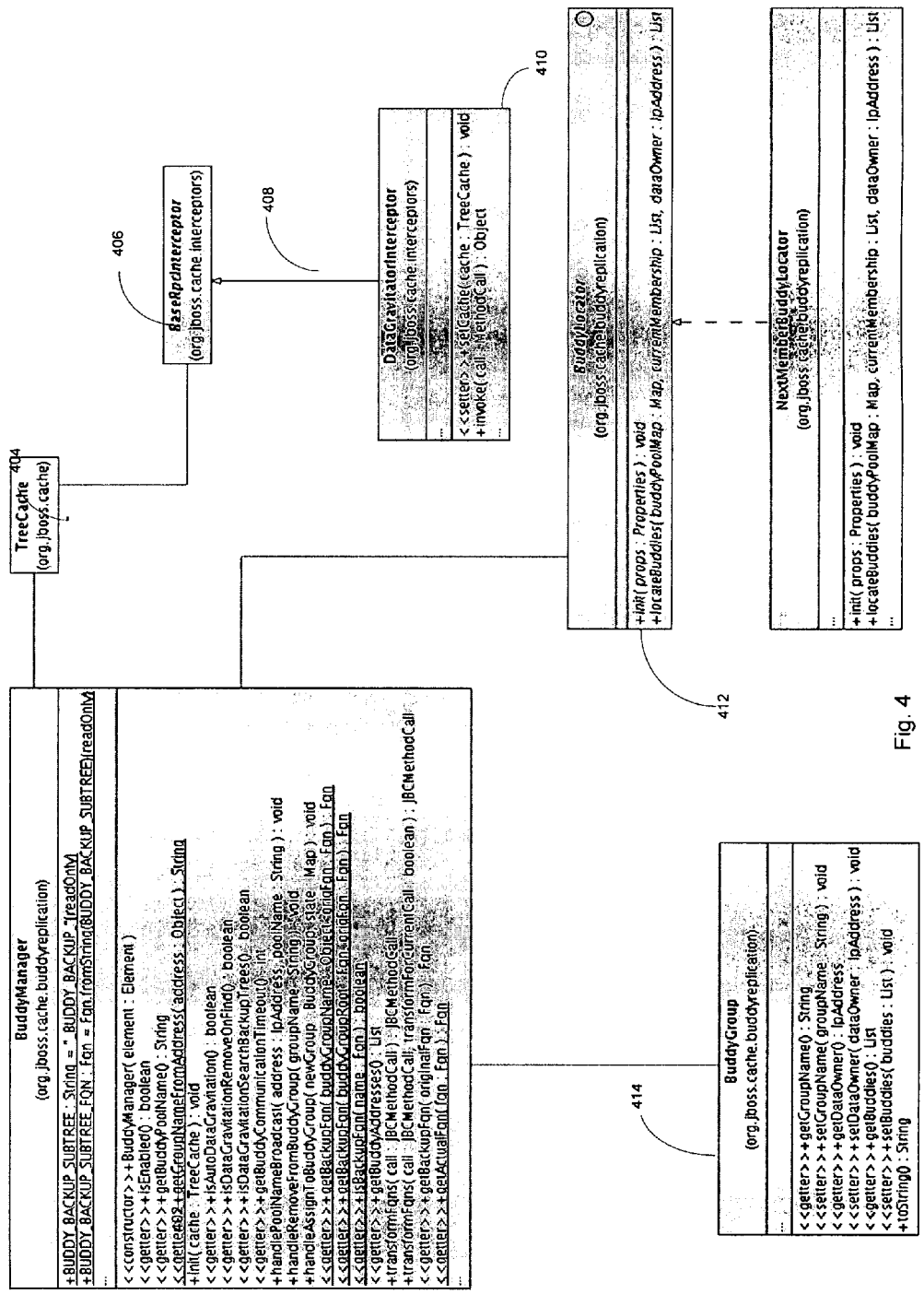
FIG. 4 illustrates a block diagram of an architecture of one embodiment of an API class structure for buddy replication.

FIG. 4 illustrates a block diagram of an architecture of one embodiment of an API class structure for buddy replication. TreeCache class 404 is enhanced to define three new internal methods:

public void_remoteAssignToBuddyGroup(BuddyGroup group, Map state)

public void_remoteRemoveFromBuddyGroup(String groupName)

public void_remoteAnnounceBuddyPoolName(IpAddress address, String buddyPoolName)

The first two methods are called on remote caches (buddies) by Data Owners to add them or remove them from a BuddyGroup 414. The last one is called on all remote caches (multicast) every time a view change is detected, so each cache has an accurate map of buddy pools. This method is only called if a buddy pool is configured.

BuddyManager class 402 controls the group for which a TreeCache 404 instance is a data owner as well as all other groups for which the TreeCache 404 instance participates as a buddy. If buddy replication is configured, an instance of BuddyManager 402 is created and referenced by the Tree-Cache 404. BuddyManager 402 maintains a reference to a single BuddyGroup 414 for which the TreeCache 404 instance is Data Owner, as well as a collection of Buddy-Groups for which the TreeCache is a buddy. BuddyManager class 402 creates a BuddyGroupMembershipMonitor, which implements TreeCacheListener, and registers this monitor to react to changes in the underlying group structure. Buddy-Manager class 402 also maintains a reference to an instance of BuddyLocator, used to build a BuddyGroup 414.

BuddyGroup class 414 maintains a List of Addresses which represent the buddy nodes for the group. The class also maintains an Address reference of the Data Owner as well as a String representing the group name (dataOwnerAddress.toString( )). The class also creates an Fqn which is a backup root for this group, typically being the value of Fqn.from-String("/_buddy_backup_/"+groupName). This is used by BuddyManager.transformFqns(MethodCall call). This class will be passed over the wire as an argument to RPC calls.

For BaseRPCInterceptor class 406, when replicateCall( ) is called on this interceptor, it will only replicate to BuddyManager.getBuddyAddresses( ) rather than the entire cluster, if a BuddyManager 402 is available. In addition, it will transform the method call it tries to replicate by using BuddyManager.transformFqns(MethodCall call) before replicating anything.

BuddyLocator class 410 defines two methods: (1) public void init(Properties p) which is used to pass in locator specific properties to the implementation on startup; and (2) public List getBuddies(List groupMembers) which selects one or more buddies from a list of group members. End users may extend buddy replication functionality by providing their own buddy locating algorithms.

NextMemberBuddyLocator class 412 picks a buddy based on who is 'next in line'. Will take in an optional configuration property numBuddies (defaults to 1) and will attempt to select as many buddies when getBuddies( ) is called. This also takes in another optional configuration property ignoreColocated-Buddies, defaulting to true, which ensures that nodes on the same physical machine are not selected as buddies.

Colocated nodes are detected by comparing their InetAddress properties. We can also detect all the InetAddress instances available on a single host by consulting the enumeration returned by java.net.NetworkInterface.getNetworkInterfaces( ). This will conclusively tell us whether 2 cluster members are on the same host or not.

Only buddies who share the same pool name are considered if buddyPoolName is configured. In the end, buddy pools and ignoring colocated hosts are just hints—if no buddies can be found to meet these constraints, buddies that do not meet these constraints will be tried.

Transferring State

When a buddy is nominated to participate in a BuddyGroup (by having its _remoteAssignToGroup( ) method called), the Data Owner's state will be pushed as an argument of the call. State is then stored under /_buddy_backup_/server01:7890/. Note that this takes place in a separate thread, so that _remoteAssignToGroup( ) can return immediately.

One major change in the state transfer code will be to exclude anything under /_buddy_backup_when marshalling the tree. Also, when invoked by BuddyManager.assignTo-Group( ), the state transfer process should be able to store state received in the relevant backup subtree. This may mean overloading the local state transfer method with a root under which state would be stored, defaulting to TreeCache.ge-tRoot( ). Note that this does not affect remote state transfer methods so there should be no issue regarding backward compatibility.

Also, with buddy replication, initial state transfers should always be disabled as nodes will pull down state relevant to their BuddyGroups as they are assigned to such groups.

Computer System

Figure 5:
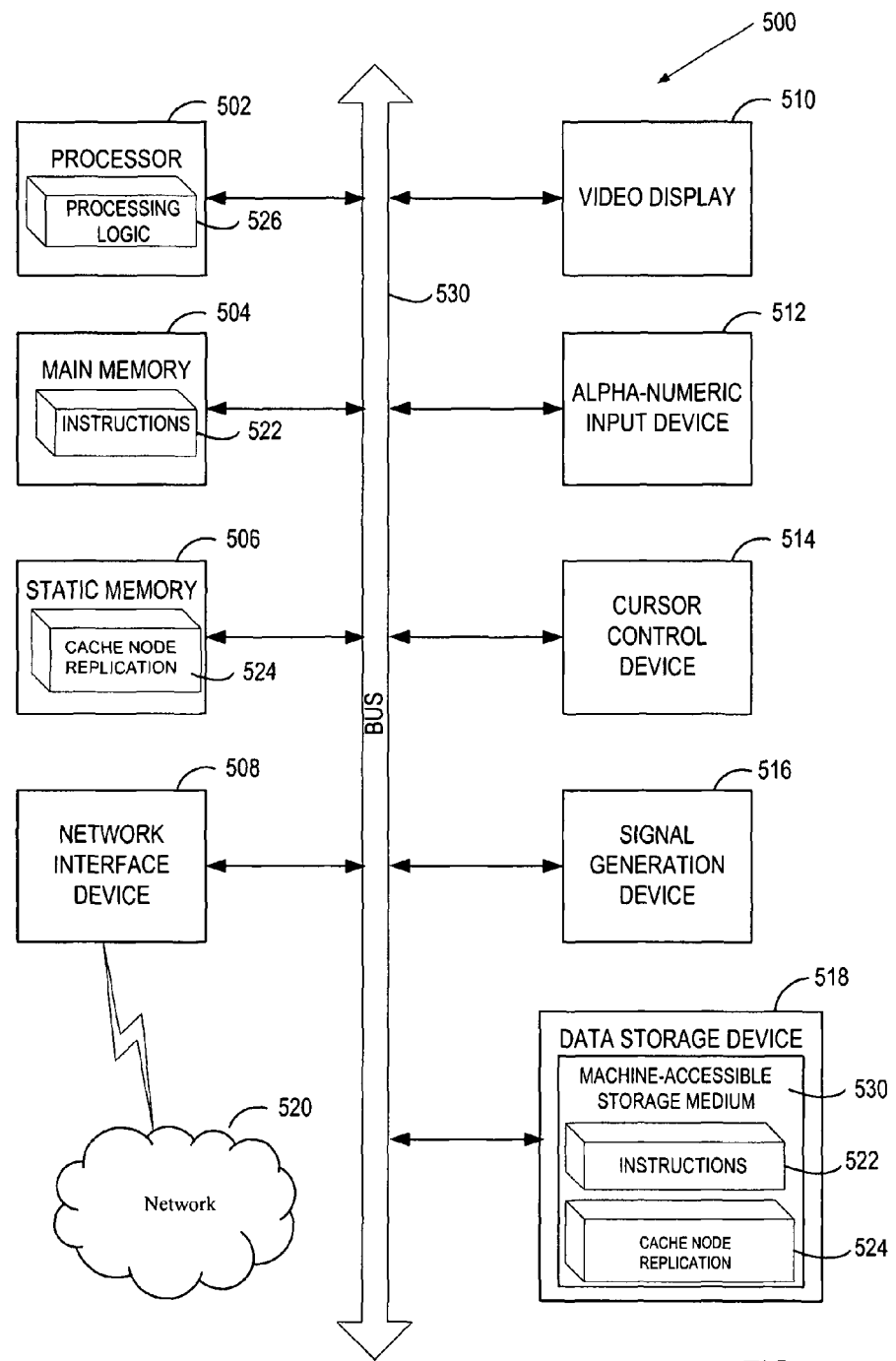
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store buddy replication configurations 524. Buddy replication configurations 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
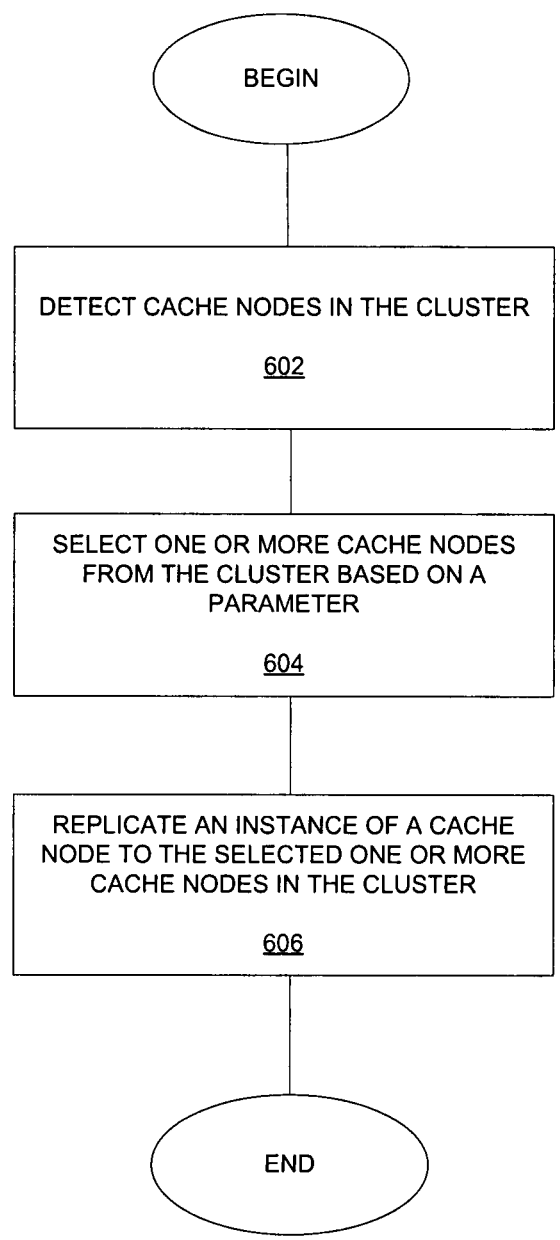
FIG. 6 illustrates a flow diagram of one embodiment of a method for replicating cache nodes in a cluster.

FIG. 6 illustrates a flow diagram of one embodiment of a method for replicating cache nodes in a cluster. At 602, available cache nodes are detected in the cluster.

At 604, one or more cache nodes from the cluster are selected based on a parameter. The parameter may include the number of cache nodes on which the instance of the cache node is to be replicated, whether the cache nodes are located on a different physical host than the physical host of the cache node to be replicated, whether the cache nodes are located on a different physical rack than the physical rack of the cache node to be replicated.

At 606, an instance of a cache node is replicated to only one of the selected one or more cache nodes in the cluster.

In another embodiment, one or more pools of cache nodes are formed in the cluster where an instance of a cache node from a pool is replicated to one or more cache nodes in the same pool. In another embodiment, the cache nodes from a pool may be located on different physical racks.

In one embodiment, the cache node is used by a servlet container to store HTTP session data, where the HTTP session data is accessed on one instance of the cache node on which the HTTP session data resides.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Thus, a method and apparatus for replicating cache nodes in a tree-structure cache cluster have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying an instance of a first cache node in a pool in a cluster;
   nominating a second cache node to participate in the pool in the cluster to replicate the first cache node;
   selecting the second cache node to participate in the pool in the cluster in view of a parameter, wherein the parameter indicates that the second cache node is located on a different physical rack than the physical rack of the first cache node;
   determining a failure of the first cache node;
   initiating a state transfer to the second cache node in view of the failure of the first cache node; and
   replicating the instance of the first cache node to the second cache node in view of the state transfer.

2. The method of claim 1, wherein the parameter indicates whether the second cache node is located on a different physical host than the physical host of the first cache node to be replicated.

3. The method of claim 1, further comprising:
   forming a pool comprising the second cache node in the cluster.

4. The method of claim 3, wherein the second cache node in the pool is located on a different physical rack.

5. The method of claim 1, wherein the first cache node stores HTTP session data.

6. The method of claim 5 wherein the HTTP session data is accessed on one instance of the first cache node on which the HTTP session data resides.

7. The method of claim 1, further comprising:
   transferring data from the first cache node to the second cache node;
   slicing the data into a plurality of data slices; and
   distributing each of the plurality of data slices to each cache node in the pool.

8. The method of claim 1, wherein the second cache node is selected in view of being connected to a power source that is different from a power source that is connected to the first cache node.

9. A system comprising:
   a memory; and
   a processing device coupled to the memory to:
      identify an instance of a first cache node in a pool in a cluster,
      nominate a second cache node to participate in the pool in the cluster to replicate the first cache node;
      select the second cache node to participate in the pool in the cluster in view of a parameter, wherein the parameter indicates that the second cache node is located on a different physical rack than the physical rack of the first cache node,
      determine a failure of the first cache node in the cluster;
      initiate a state transfer to the second cache node in view of the failure of the first cache node; and
      replicate the instance of the first cache node to the second cache node in view of the state transfer.

10. The system of claim 9, wherein the parameter indicates whether the second cache node is located on a different physical host than the physical host of the first cache node to be replicated.

11. The system of claim 9, the processing device is to further to:
    form a pool comprising the second cache node in the cluster.

12. The system of claim 11, wherein the second cache node in the pool is located on a different physical rack.

13. The system of claim 9, wherein the first cache node stores HTTP session data.

14. The system of claim 13, wherein the HTTP session data is accessed on one instance of the first cache node on which the HTTP session data resides.

15. A non-transitory computer-readable storage medium, having instructions stored therein, which when executed, cause a processing device to execute operations comprising:
    identifying an instance of a first cache node in a pool in a cluster;
    nominating a second cache node to participate in the pool in the cluster to replicate the first cache node;
    selecting the second cache node to participate in the pool in the cluster in view of a parameter, wherein the parameter indicates that the second cache node is located on a different physical rack than the physical rack of the first cache node;
    determining a failure of the first cache node;
    initiating a state transfer to the second cache node in view of the failure of the first cache node; and
    replicating the instance of the first cache node to the second cache node in view of the state transfer.

16. The non-transitory computer-readable storage medium of claim 15, wherein the parameter indicates whether the second cache node is located on a different physical host than the physical host of the first cache node to be replicated.

17. The non-transitory computer-readable storage medium of claim 15, wherein the operations further comprises:
    forming a pool comprising the second cache node in the cluster.

18. The non-transitory computer-readable storage medium of claim 17, wherein the second cache node is in the pool is located on a different physical rack.

19. The non-transitory computer-readable storage medium of claim 15, wherein the first cache node stores HTTP session data.

20. The non-transitory computer-readable storage medium of claim 19, wherein the HTTP session data is accessed on one instance of the first cache node on which the HTTP session data resides.

* * * * *